United States Patent [19]

Kobari et al.

[11] Patent Number: 5,468,016
[45] Date of Patent: Nov. 21, 1995

[54] GAS GENERATING AGENT PACK OF AIR BAG INFLATION GAS GENERATOR

[75] Inventors: Hirokazu Kobari; Junichi Kishimoto, both of Fukushima, Japan

[73] Assignee: Nippon Koki Co., Ltd., Tokyo, Japan

[21] Appl. No.: 152,217

[22] Filed: Nov. 12, 1993

[51] Int. Cl.⁶ .................................................. B60R 21/28
[52] U.S. Cl. ........................................................ 280/741
[58] Field of Search ...................................... 280/741, 742, 280/736

[56] References Cited

U.S. PATENT DOCUMENTS

| | | | |
|---|---|---|---|
| 3,420,174 | 1/1969 | Potter | 102/202.6 |
| 4,729,315 | 3/1988 | Proffit et al. | 102/202.9 |
| 5,100,174 | 3/1992 | Jasken et al. | 280/741 |
| 5,131,679 | 7/1992 | Novak et al. | 280/741 |

*Primary Examiner*—Kenneth R. Rice
*Attorney, Agent, or Firm*—Kalish & Gilster

[57] ABSTRACT

This invention relates to a gas generating agent pack of an air bag inflation gas generator that is used to form a combustion chamber in the air bag inflation gas generator and aims to steeply improve reliability for ignition capacity as compared with the prior art by a simple structure. And, this invention consists of accommodating a plurality of gas generating agents with a through hole formed at the center in the stacked state in the axial direction within a longitudinal cylindrical pack, sealing one end of the cylindrical pack with a cap, inserting a projection for accommodating an igniter formed to project at the center of the cap into the through hole of the gas generating agent disposed at one end of the cylindrical pack, and disposing an ignition agent next to the end face of the projection of the cap within the through hole of the gas generating agent disposed at one end of the cylindrical pack.

5 Claims, 7 Drawing Sheets

GAS GENERATING AGENT PACK OF AIR BAG INFLATION GAS GENERATOR

BACKGROUND OF THE INVENTION

1. Field of the Invention

This invention relates to a gas generating agent pack of an air bag inflation gas generator that is used to form a combustion chamber in the air bag inflation gas generator.

2. Description of the Prior Art

A prior shock absorber to protect a passenger car driver from shocks at a collision accident comprises an air bag having a capacity of, for example, 60 liters and a gas generator to inflate the air bag with gas. At a collision accident of a passenger car, explosives or other gas generating agents having a similar composition thereto, which are charged in the gas generator, are ignited and burnt to produce gas. The air bag is instantaneously inflated by the resultant gas to protect the driver against any collision shocks, thereby avoiding possible serious injury of the driver.

FIG. 7 shows a prior air bag inflation gas generator disclosed in Japanese Patent Application Laid-open Print No. 2-155857. In the drawing, the reference numeral 11 shows a combustion chamber containing a plurality of gas generating agents 13 in the stacked state.

The gas generating agents 13 are a circular plate having a through hole 15 at the center, and the through hole 15 accommodates an ignition agent 17.

These gas generating agents 13 are accommodated in a concealed container 19. At the center of this concealed container 19, a concave part 21 is formed to be depressed toward the through hole 15 of the gas generating agents 13.

In the concave part 21 is provided an igniter 23 to burn the gas generating agents 13.

The combustion chamber 11 has a combustion chamber filter 25 disposed along its inner wall. And, a plenum chamber 27 annually surrounds the combustion chamber 11 and receives gas flow through an orifice 26 from the combustion chamber filter 25.

The plenum chamber 27 contains a plenum chamber filter consisting of an upper filter 29 and a gas filter 31.

And, the plenum chamber 27 contains a gas outlet 33 to supply the gas flow from the gas filter 31 to an air bag.

In this type of air bag inflation gas generator, the powder in the igniter 23 burns the ignition agent 17 when the igniter is energized. The ignition agent 17 in turn causes the gas generating agents 13 to burn. Gas from the gas generating agents 13 flows into the plenum chamber 27 through the combustion chamber filter 19 disposed along the inner wall of the combustion chamber 11. The gas is then purified by the upper filter 29 and the gas filter 31 and flows into the air bag through the gas outlet 33. The air bag can be completely inflated within a very short time, for example, approximately 0.04 second.

The above prior air bag inflation gas generator, however, has drawbacks that the capacity of combustion gas of the gas generating agents 13 is limited and the combustion gas purifying performance is limited.

More specifically, when the air bag for a front passenger is inflated, because the front passenger seat has a different riding environment from the driver seat and a passenger takes various positions, and when a child takes the front passenger seat, physical features are different from an adult, requiring, for example, an air bag to have a large capacity of about 2.5 times of a conventional air bag for the driver seat. Therefore, it has been demanded that the combustion gas capacity of the gas generating agents is large and the gas generator for air bag inflation can purify the large volume of combustion gas surely.

The present inventor has filed an air bag inflation gas generator which has remedied the above problems (Japanese Patent Application Laid-open Print No. 4-146843).

As shown in FIG. 8, the above air bag inflation gas generator comprises forming combustion chambers 45, 46 for accommodating gas generating agents 43 by a partition member 47 on either end of a longitudinal cylindrical member 41 which has gas outlets 39 formed in its middle section 37, disposing a cylindrical final filter 49 inside the middle section 37 of the cylindrical member 41, disposing an intermediate filter 51 between the final filter 49 and the partition member 47 within the cylindrical member 41, and opening an orifice 53 in the partition member 47 on the side of the intermediate filter 51.

And, the combustion chamber 45 at one end and the combustion chamber 46 at the other end are connected by a fuse device 54 which ignites the gas generating agents 43 in the combustion chamber 46 at the other end a certain time after starting the combustion of the gas generating agents in the combustion chamber 45 at one end.

With this air bag inflation gas generator, the combustion gas capacity of the gas generating agents 43 can be increased by a large margin as compared with the prior art and a large volume of combustion gas can be surely purified.

Since this air bag inflation gas generator forms the combustion chambers 45, 46 for accommodating the gas generating agents 43 at both ends of the cylindrical member 41 by the partition member 47 and connects the combustion chambers 45, 46 by the fuse device 54, it has drawbacks that the device has a complicated structure and the ignition capacity lacks in reliability.

SUMMARY OF THE INVENTION

This invention has remedied the above drawbacks and aims to provide a gas generating agent pack of an air bag inflation gas generator which has extensively improved reliability for ignition capacity than the prior art in a simple structure.

The gas generating agent pack of an air bag inflation gas generator according to this invention consists of accommodating a plurality of gas generating agents with a through hole formed at the center in the stacked state in the axial direction within a longitudinal cylindrical pack whose one end is open, sealing one end of the cylindrical pack with a cap, inserting a projection for accommodating an igniter formed at the center of the cap to project therein into the through hole of the gas generating agent disposed at one end of the cylindrical pack, and disposing an ignition agent next to the end face of the projection of the cap within the through hole of the gas generating agent disposed at one end of the cylindrical pack.

In the gas generating agent of an air bag inflation gas generator according to this invention, when an electric current is passed to the igniter accommodated in the projection of the cap, the ignition agent within the through hole of the gas generating agent disposed at one end of the cylindrical pack is burnt, the burning of the ignition agent is transmitted to each gas generating agent via the through hole of the gas generating agents, and the gas generating agents

DESCRIPTION OF THE PREFERRED EMBODIMENT OF THE INVENTION

This invention will be described in detail with reference to the attached drawings.

Figure 1:
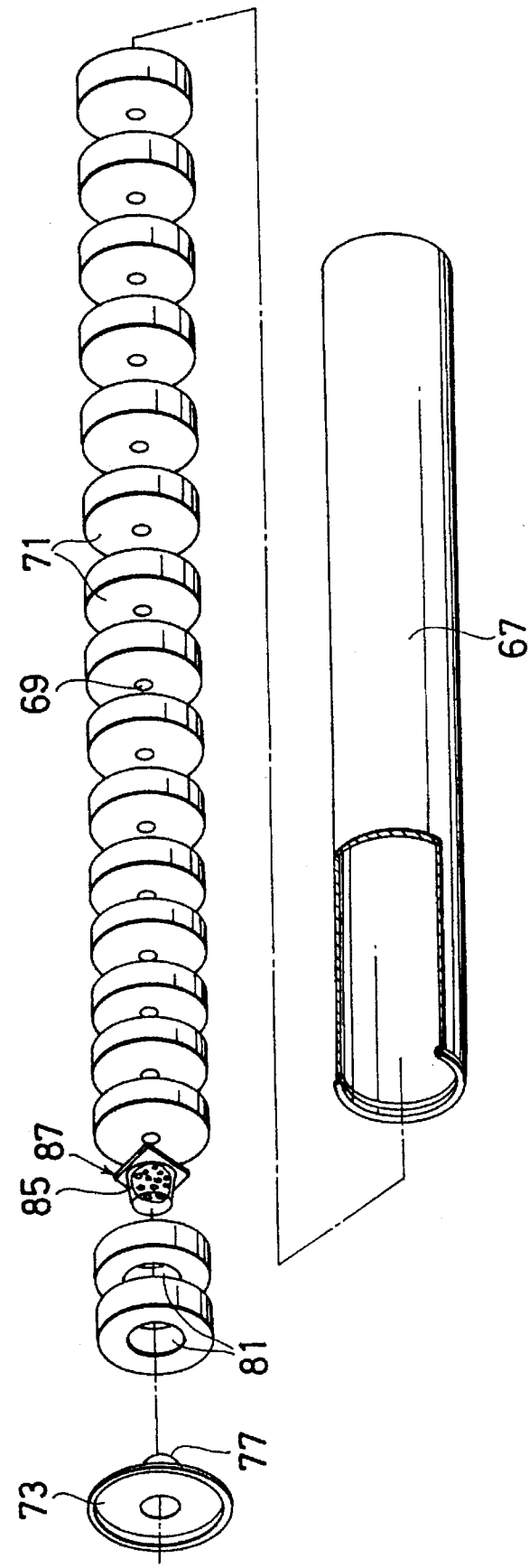
FIG. 1 is a perspective view showing one embodiment of the gas generating agent of an air bag inflation gas generator according to this invention.
Figure 2:
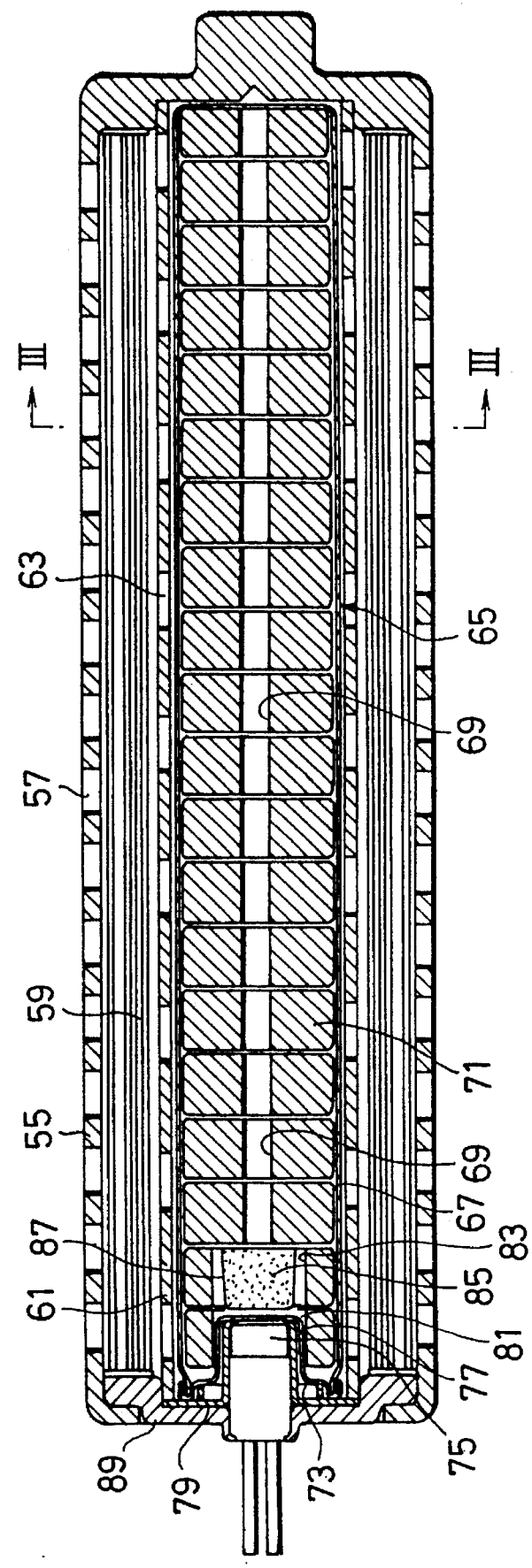
FIG. 2 is a vertical sectional view showing one embodiment of an air bag inflation gas generator in which the gas generating agent pack of FIG. 1 is disposed.
Figure 3:
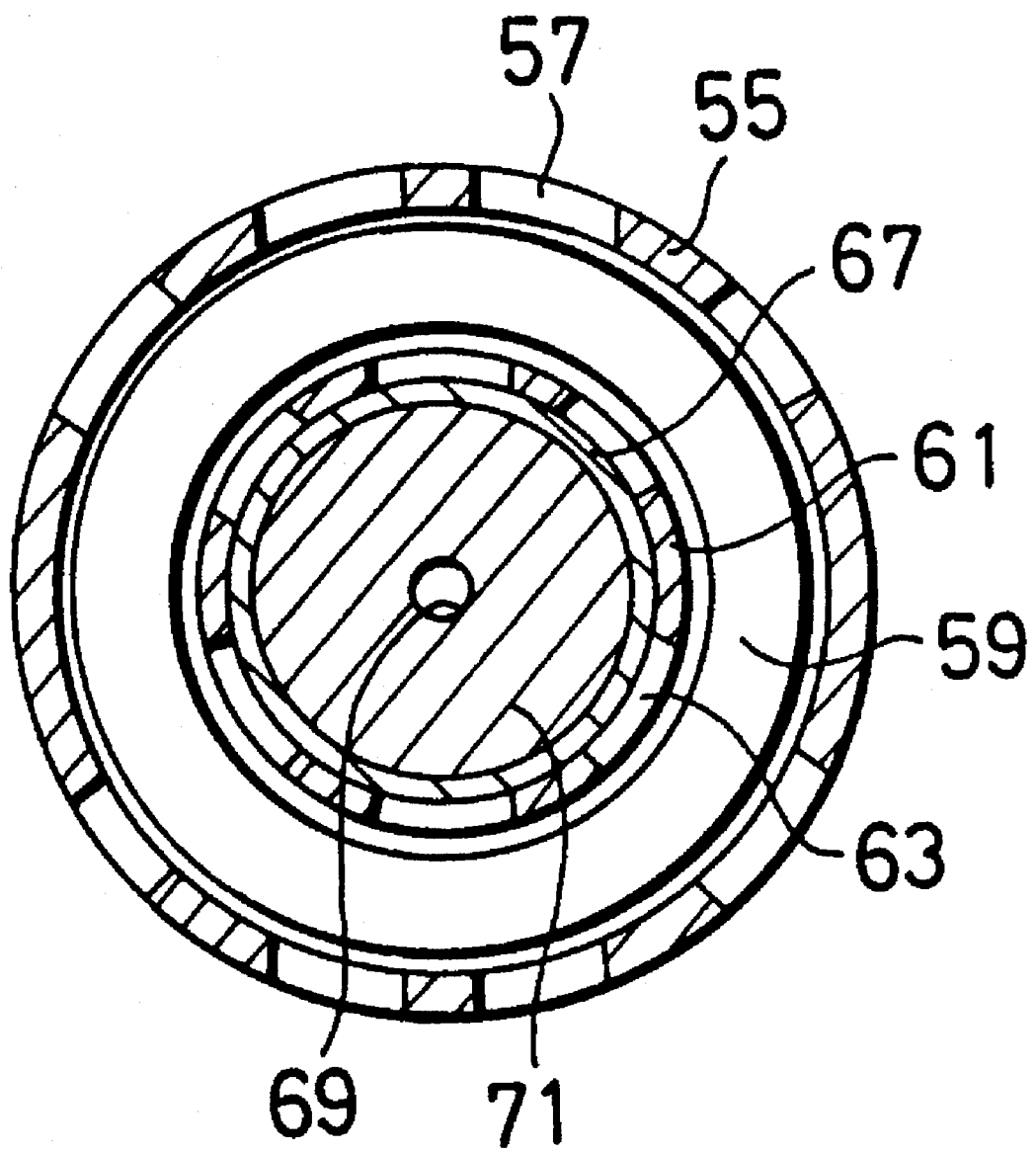
FIG. 3 is a transverse sectional view taken on line III—III of FIG. 2.
Figure 4:
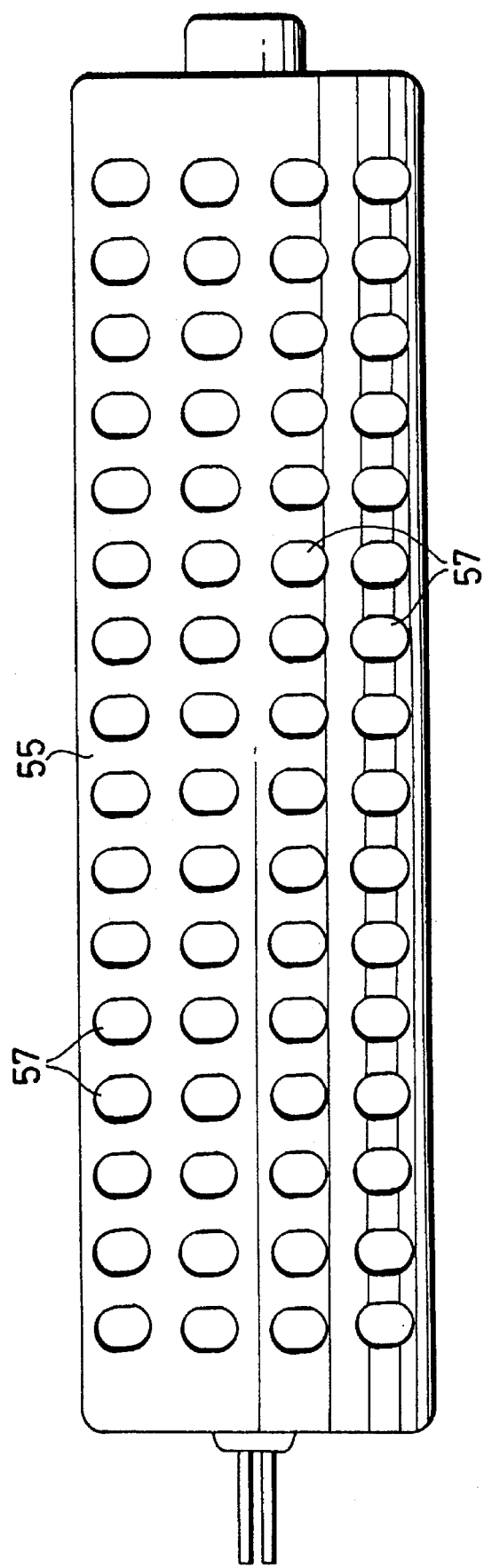
FIG. 4 is a top view of FIG. 2.
Figure 5:
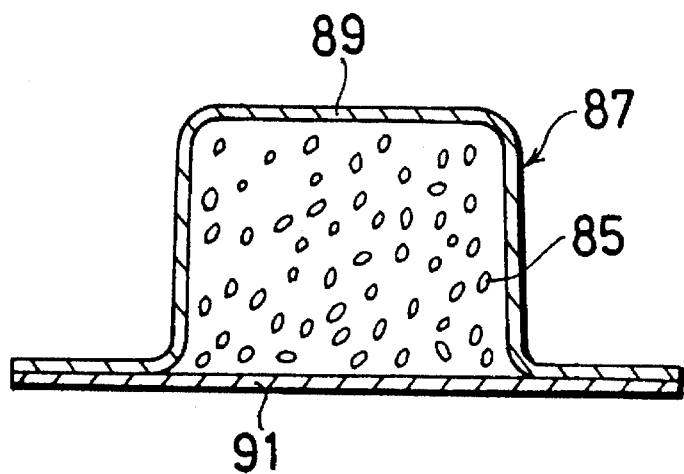
FIG. 5 is a sectional view showing the airtight container of FIG. 1.
Figure 6:
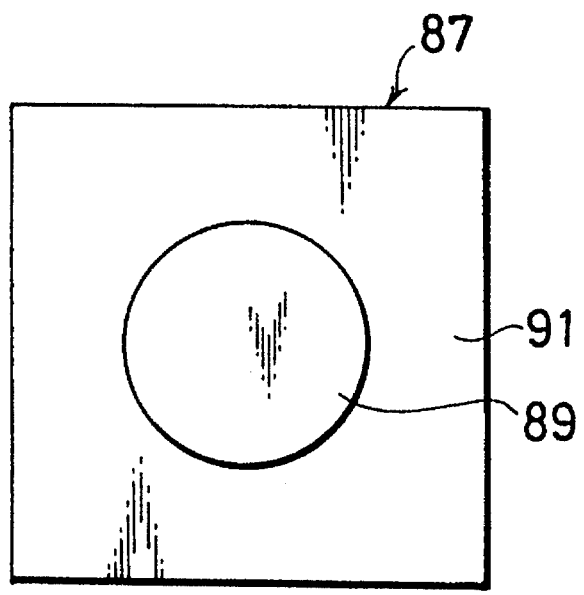
FIG. 6 is a top view of FIG. 5.
Figure 7:
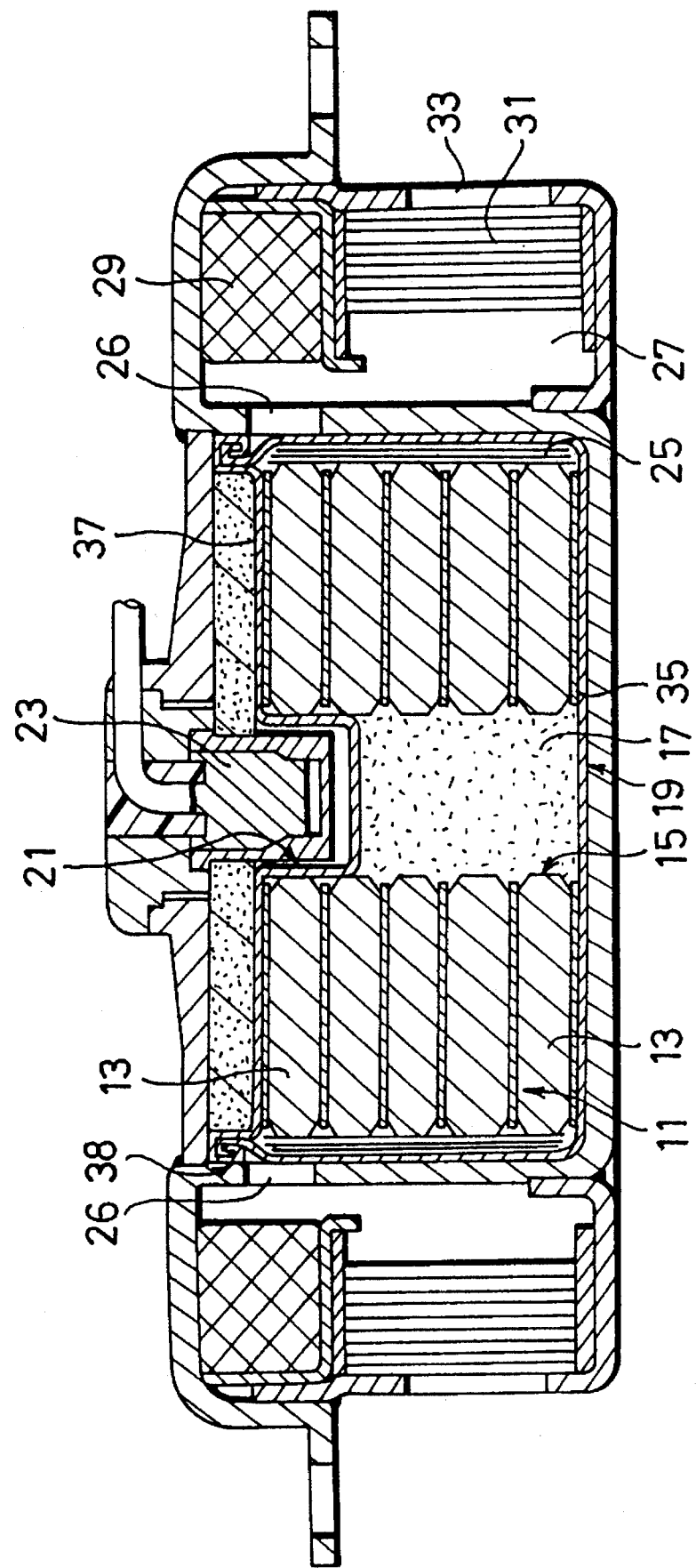
FIG. 7 is a vertical sectional view showing a conventional air bag inflation gas generator.
Figure 8:
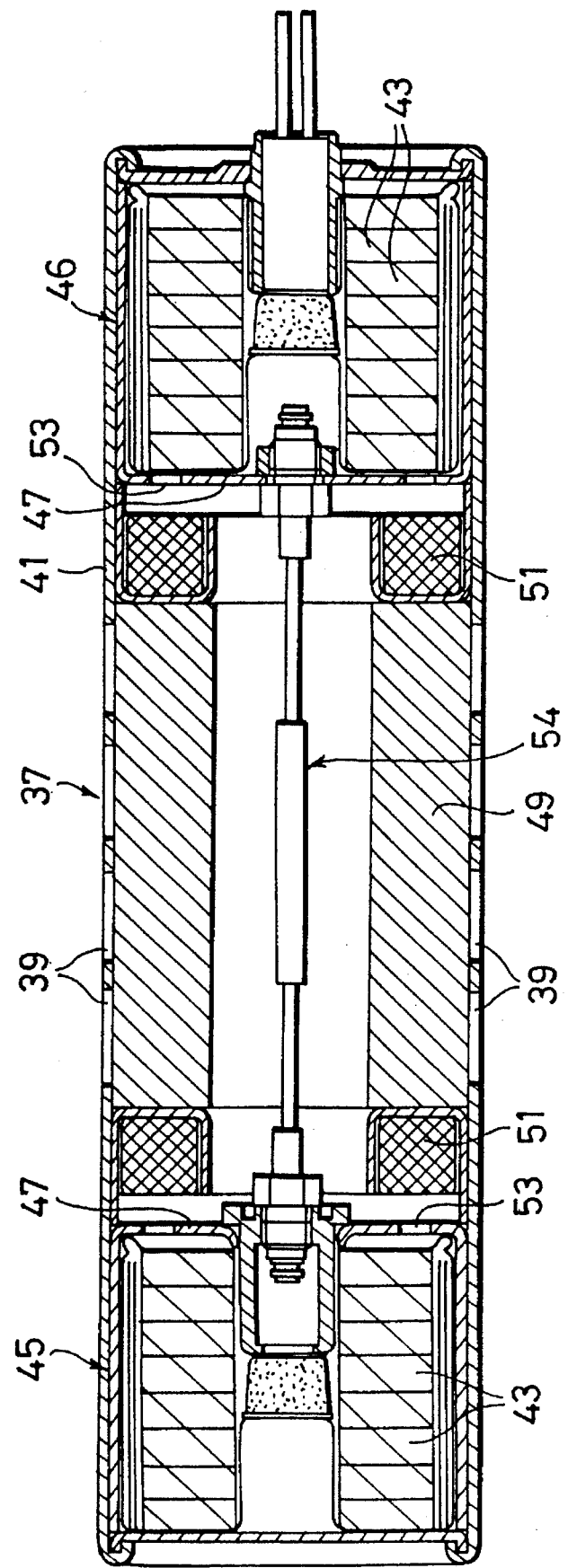
FIG. 8 is a vertical sectional view showing an air bag inflation gas generator previously filed by the applicant.

FIG. 1 shows one embodiment of the gas generating agent pack of an air bag inflation gas generator of this invention. FIG. 2 to FIG. 4 show an air bag inflation gas generator in which the gas generating agent pack of FIG. 1 is disposed.

In FIG. 2 to FIG. 4, the reference numeral 55 represents a bottom-closed longitudinal outer cylindrical member.

The outer cylindrical member 55 has a plurality of gas flow openings 57 formed in its outer periphery entirely.

The outer cylindrical member 55 has a cylindrical final filter 59 disposed therein.

This final filter 59 is formed by winding, for example, fine-mesh woven metal wire, close-woven metal wire, etc. in layers. This filter has the functions that the combustion gas is cooled so that the air bag is not damaged, the combustion residue contained in the combustion gas is removed, and harmless nitrogen gas only is supplied into the air bag.

Inside the final filter 59 is inserted an inner cylindrical member 61.

The inner cylindrical member 61 has many gas flow openings 63 formed in the entire length of the outer periphery thereof.

The inner cylindrical member 61 accommodates a gas generating agent pack 65 which is one embodiment of this invention.

Specifically, the reference numeral 67 in FIG. 1 and FIG. 2 represents a bottom-closed longitudinal cylindrical pack made of, for example, aluminum.

Within the cylindrical pack 67, a plurality of gas generating agents 71 having a through hole 69 formed in their center are accommodated in the stacked state in the axial direction.

A cap 73 has its outer periphery fasten-folded with the cylindrical pack 67.

At the center of the cap 73, a projection 77 is formed to accommodate an igniter 75.

The projection 77 is inserted into a through hole 81 of the gas generating agent 71 disposed at one end of the bottom-closed cylindrical pack 67 via an igniter holder 79.

An ignition agent 85 is disposed next to the end face of the projection 77 of the cap 73 within the through hole 81 of the gas generating agent 71 disposed at one end of the cylindrical pack 67.

The ignition agent 85 is accommodated in an airtight container 87.

And, this airtight container 87 consists of a bottom-closed cylindrical cup 89 for accommodating the ignition agent 85 and a square film 91 for sealing the opening of the cup 89.

The cup 89 is made of, for example, polypropylene, polystyrene or aluminum foil and has a thickness of 0.5 mm for example.

And, the film 91 is airtightly bonded to the opening of the cup 89 with the ignition agent 85 accommodated within the cup 89.

The film 91 is bonded to the cup 89 by, for example, applying a pressure sensitive adhesive to one side of the film 91, accommodating the ignition agent 85 within the cup 89 in advance, adhering the film 91 to the square section of the cup 89 with the pressure sensitive adhesive.

In this embodiment, the ignition agent 85 is mixed with an ignition temperature adjusting substance having the ignition temperature of, for example, 180° C. which is higher than the ignition temperature of, for example, 150 ° C. of the gas generating agent 71.

This ignition temperature adjusting substance is formed of a simple substance of azide of alkaline earth metal consisting of calcium, strontium and barium or a mixture thereof.

And, the ignition temperature adjusting substance and magnesium are subjected to an agglomeration treatment with polytetrafluoroethylene and polychloro trifluoroethylene as binders.

More specifically, the ignition agent 85 of this example is a flocculent ignition agent which consists of, for example, 50% by weight of barium azide, 28% by weight of magnesium, 18% by weight of polytetorafluoroethylene, and 4% by weight of polychloro trifluoroethylene. For example, when 1.1 g of the ignition agent is used, its calorific value is 1940 calories/g and gas yield is 41 cc/g. When compared with a conventional ignition agent consisting of boron and potassium nitrate having a caloric value of 1790 calories/g and a gas yield of 79 cc/g, the caloric value is higher and the gas yield is lower, so that the gas generating agent 71 is not cracked and the performance without a time lag can be obtained.

In the aforementioned air bag inflation gas generator, the ignition agent 85 burns when electricity is sent to the igniter 75, which in turn burns the gas generating agents 71, the cylindrical pack 67 of the gas generating agent pack 65 is broken at the gas flow openings 63 of the inner cylindrical member 61, the combustion gas flows into the final filter 59 through the gas flow openings 63 of the inner cylindrical member 61 and is purified by the final filter 59, then it is flown into the air bag through the gas outlets 57 of the outer cylindrical member 55.

And, in the above embodiment, when electricity is sent to the igniter 75 which is disposed at one end of the inner cylindrical member 61, the ignition agent 85 in the cylindrical pack 67 is burnt, this burning is transmitted to each gas generating agent 71 via the through hole 69 of the gas generating agents 71, and the gas generating agents 71 are burnt.

In the gas generating agent pack of the air bag inflation gas generator configured as described above, a plurality of gas generating agents 71 with the through hole 69 formed at the center are accommodated in the stacked state in the axial direction within the longitudinal cylindrical pack 67 whose one end is open, one end of the cylindrical pack 67 is sealed with the cap 73, the projection 77 for accommodating the igniter 75 formed at the center of the cap 73 to project therein is inserted into the through hole 81 of the gas generating agent 71 disposed at one end of the cylindrical pack 67, and the ignition agent 85 is disposed next to the end face of the projection 77 of the cap 73 within the through hole 81 of the gas generating agent 71 disposed at one end of the cylindrical pack 67. Thus, reliability for ignition capacity can be remarkably improved as compared with the prior art in a simple structure.

Specifically, in the aforementioned gas generating agent pack 65, since the gas generating agents 71 with the through hole 69 formed at the center are stacked to the entire length of the inner cylindrical member 61, the device is made very simple as compared with the prior part in which the combustion chamber is formed on either end of the cylindrical member.

When electricity is sent to the igniter 75 which is accommodated in the projection 77 of the cap 73, the ignition agent 85 within the through hole 81 of the gas generating agent 71 which is disposed at one end of the cylindrical pack 67 is burnt, this burning of the ignition agent 85 is transmitted to each gas generating agent 71 via the through hole 69 of the gas generating agents 71, and the gas generating agents 71 are surely burnt, so that reliability for ignition capacity can be remarkably improved as compared with the prior art.

And, since the aforementioned gas generating agent pack 65 accommodates the ignition agent 85 within the through hole 81 of the gas generating agent 71, the device can be made small and compact.

Furthermore, the aforementioned gas generating agent pack 65 securely seals the gas generating agents 71 and the ignition agent 85 with the cylindrical pack 67, so that possibility of damping the gas generating agents 71 and the ignition agent 85 due to aged deterioration can be reduced.

In the aforementioned gas generating agent pack 65, the ignition agent 85 is mixed with an ignition temperature adjusting substance having the ignition temperature which is higher than the maximum temperature which will generally occur in an automobile interior. Therefore, the ignition agent 85 is surely ignited when the temperature in an automobile interior reaches a temperature which is lower than the ignition temperature of the gas generating agents 71 and higher than the maximum temperature which will generally occur in the automobile interior. And possibility of breakage to a container or the like forming the combustion chambers such as the inner cylindrical member 61 and the outer cylindrical member 55 can be solved.

Thus, it is possible to easily obtain an air bag inflation gas generator having an automatic ignition function under high-temperature environment.

Furthermore, since the ignition agent 85 is sealed double by the airtight container 89 and the cylindrical pack 67, possibility of damping the ignition agent 85 due to aged deterioration can be steeply reduced as compared with the prior art.

INDUSTRIAL FEASIBILITY FOR UTILIZATION

As described above, the air bag inflation gas generator according to this invention can steeply improve reliability for ignition capacity as compared with the prior art by a simple structure. And, since this air bag inflation gas generator accommodates the ignition agent within the airtight container, it has advantages that handling property of the ignition agent can be steeply improved than the prior art and possibility of damping the ignition agent can be steeply lowered than the prior art.

What is claimed is:

1. A gas generating agent pack of an air bag inflation gas generator comprising a plurality of gas generating agents having a through hole formed at a center of said gas generating agents, said gas generating agents being accommodated in a stacked state in an axial direction within a longitudinal cylindrical pack, said longitudinal cylindrical pack having an open end, a cap for sealing said open end of said cylindrical pack, said cap having an end face, said end face being adjacent to said gas generating agents, a projection extending downwardly from said cap into said cylindrical pack, said protection accommodating an igniter formed at the center of the cap, an igniter for igniting an ignition agent, whereby said igniter extends downwardly into said through hole of said gas generating agents disposed at said open end of said cylindrical pack, and an ignition agent being positioned within said through hole of the gas generating agents of said open end of said cylindrical pack, such that said ignition agent is disposed between said end face of the projection of said cap and gas generating agents of said plurality of gas generating agents.

2. A gas generating agent pack of an air bag inflation gas generator according to claim 1, wherein said cylindrical pack and cap are made of aluminum.

3. A gas generating agent pack of an air bag inflation gas generator according to claim 1, wherein said ignition agent is accommodated in an airtight container.

4. A gas generating agent pack of an air bag inflation gas generator comprising a plurality of gas generating agents having a through hole formed at a center of said gas generating agents, said gas generating agents being accommodated in a stacked state in an axial direction within a longitudinal cylindrical pack, said longitudinal cylindrical pack having an open end, a cap having an end face for sealing said open end of said cylindrical pack, said end face being adjacent to said gas generating agents, a projection extending downwardly from said cap into said cylindrical pack, said projection accommodating an igniter formed at the center of the cap, an igniter for igniting an ignition agent, whereby said igniter extends downwardly into said through hole of said gas generating agents disposed at said open end of said cylindrical pack, and an ignition agent being positioned within said through hole of the gas generating agents of said open end of said cylindrical pack, such that said ignition agent is disposed between said end face of the projection of said cap and gas generating agents of said plurality of gas generating agents, wherein said ignition agent is mixed with an ignition temperature adjusting substance having an ignition temperature which is higher than that of said gas generating agents.

5. A gas generating agent pack of an air bag inflation gas generator comprising a plurality of gas generating agents having a through hole formed at a center of said gas generating agents, said gas generating agents being accommodated in a stacked state in an axial direction within a longitudinal cylindrical pack, said longitudinal cylindrical pack having an open end, a cap having an end face for sealing said open end of said cylindrical pack, said end face being adjacent to said gas generating agents, a projection extending downwardly from said cap into said cylindrical pack, said projection accommodating an igniter formed at the center of the cap, an igniter for igniting an ignition agent, whereby said igniter extends downwardly into said through hole of said gas generating agents of said open end of said cylindrical pack, and an ignition agent being positioned within said through hole of the gas generating agents of said open end of said cylindrical pack, such that said ignition agent is disposed between said end face of the projection of said cap and gas generating agents of said plurality of gas generating agents, wherein said ignition agent is mixed with an ignition temperature adjusting substance having an ignition temperature which is higher than that of said gas generating agents, wherein said ignition temperature adjusting substance is formed of a simple substance of azide of alkaline earth metal consisting of calcium, strontium and barium or a mixture thereof.

* * * * *